United States Patent [19]
Little

[11] Patent Number: 5,932,262
[45] Date of Patent: Aug. 3, 1999

[54] METHOD OF FLAVORING A BABY BOTTLE NIPPLE DEVICE AND NIPPLE DEVICE HAVING FLAVOR INCORPORATED THEREIN

[76] Inventor: Misty L. Little, 32626 121st Street, E., Pearblossom, Calif. 93553

[21] Appl. No.: 08/863,338

[22] Filed: May 27, 1997

[51] Int. Cl.⁶ .................................................. A23L 1/22
[52] U.S. Cl. ........................ 426/420; 426/115; 426/117; 426/132; 426/394; 215/11.1
[58] Field of Search ................ 426/85, 89, 115, 426/117, 124, 302, 506, 90, 132, 420, 394; 215/11.1

[56] References Cited

U.S. PATENT DOCUMENTS

| | | | |
|---|---|---|---|
| 1,149,170 | 8/1915 | Allis | 426/132 |
| 2,812,257 | 11/1957 | Scisorek | 426/85 |
| 2,889,829 | 6/1959 | Tannenbaum et al. | 426/117 X |
| 3,355,047 | 11/1967 | De Sole | 426/117 X |
| 3,532,242 | 10/1970 | Tibbs | 426/117 X |
| 3,603,454 | 9/1971 | Raaf | 426/124 X |
| 3,615,595 | 10/1971 | Guttag | 426/85 |
| 3,620,770 | 11/1971 | Harvey | 426/85 |
| 3,650,270 | 3/1972 | Frazier | 215/11.1 |
| 3,717,476 | 2/1973 | Harvey | 426/85 |
| 3,730,737 | 5/1973 | Harvey et al. | 426/132 X |
| 3,746,198 | 7/1973 | Howland | 215/11.1 |
| 3,892,243 | 7/1975 | Bell | 128/359 |
| 4,149,548 | 4/1979 | Bradshaw | 131/170 A |
| 4,192,307 | 3/1980 | Baer | 426/132 X |
| 4,513,014 | 4/1985 | Edwards | 426/132 |
| 4,813,872 | 3/1989 | Knitter | 433/136 |
| 5,013,321 | 5/1991 | MacVane | 606/234 |
| 5,072,842 | 12/1991 | White | 215/11.4 |
| 5,094,861 | 3/1992 | D'Auguste et al. | 426/85 |
| 5,109,839 | 5/1992 | Blasdell et al. | 128/203.12 |
| 5,114,374 | 5/1992 | Estiva | 446/77 |
| 5,127,903 | 7/1992 | Mailot et al. | 604/77 |
| 5,176,705 | 1/1993 | Noble | 606/236 |
| 5,635,229 | 6/1997 | Ray | 426/115 X |

*Primary Examiner*—Milton Cano
*Attorney, Agent, or Firm*—Armstrong, Westerman, Hattori, McLeland & Naughton

[57] ABSTRACT

A flavored nipple device for an infant feeding apparatus such as a baby bottle is provided having a taste-modifying agent incorporated therein in an amount effective to modify the taste of a beverage dispensed through the device. The flavored nipple encourages young children to drink adequate amounts of important dietary liquids, such as water, by providing such liquids with improved taste.

19 Claims, 2 Drawing Sheets

METHOD OF FLAVORING A BABY BOTTLE NIPPLE DEVICE AND NIPPLE DEVICE HAVING FLAVOR INCORPORATED THEREIN

FIELD OF THE INVENTION

The present invention relates to odored and flavored structures for beverage dispensing. Particularly, the present invention provides a straw or nipple having an odoring and/or flavoring that enhances the taste of a beverage.

BACKGROUND OF THE INVENTION

For human beings of all ages, a healthy diet includes adequate quantities of water. Without water, life is impossible. Although the general importance of water in the human diet is widely recognized, it is a rather common problem that many infants and toddlers do not ingest enough water. This is due, at least in part, to water's general lack of flavor.

It is often advisable to increase the dietary intake of water for infants and children afflicted by various health problems. Such health problems include, for example, dehydration, constipation, and Jaundice (yellowing of the skin and whites of eyes). As mentioned above, however, very young children often refuse to drink adequate quantities of water even under normal circumstances. Clearly, it is very important to encourage young children suffering from illness to drink not only their ordinary daily requirements of water, but also any additional quantities necessitated by their illness.

Another potential problem facing toddlers and small children, which can be curtailed by sufficient water intake, is tooth decay. Tooth decay may be brought on by extended exposure of a child's teeth to decay promoting beverages including those high in sugar content. Parents will often provide a baby with a bottle in order to pacify the child and get the child to sleep. Usually, the bottle will contain a liquid, other than water, which is more well readily accepted by the baby (e.g., fruit juice). In many circumstances, the baby will fall asleep with the bottle in its mouth. Unfortunately, the sugars and acids generally found is such liquids can cause tooth decay. In addition to causing decay, such sugars and acids can serve to worsen existing tooth decay. A similar problem often occurs when sugar is added to water as part of an effort to encourage a child to drink it. The addition of sugar to a child's drinking water sometimes takes place in hospitals.

In an effort to reduce the harsh effects of sugars and acids upon the baby's teeth, some parents dilute fruit juice with water before they give it to their baby. Although such action might help to mitigate decay problems, nevertheless the harsh effects are not eliminated. Of course, such problems could be entirely avoided if water were given to the baby instead of a liquid containing sugars and/or acids.

In view of the foregoing, there is clearly a need for a beverage dispensing arrangement capable of successfully encouraging young children to drink adequate amounts of water. Such an arrangement would help to ensure that children, both those which are healthy and those suffering from illness, would drink quantities of water sufficient to met daily recommended amounts. Further, such an arrangement would help avoid the problems of tooth decay since water is generally devoid of common cavity causing agents.

As can be readily ascertained from the foregoing, various improvements in the design and construction of beverage dispensing arrangements are desirable.

It is a general object of the present invention to provide an improved beverage dispensing arrangement.

It is a particular object of the present invention to provide a beverage dispensing arrangement which is embodied in a nipple or straw for a drinking container, such as a baby's drinking bottle.

It is a further object of the present invention to provide an odored and/or flavored beverage dispensing arrangement which is effective to encourage young children, infants and toddlers to successfully drink beverages, such as water, which are often refused due to a bland or otherwise objectionable taste.

It is yet a further object of the present invention to provide an arrangement for dispensing beverages which is relatively simple and low in cost, yet is reliable and efficient as a means of imparting an enjoyable taste to bland or otherwise objectionable liquids.

SUMMARY OF THE INVENTION

The present invention relates to odored and flavored structures for beverage dispensing.

Particularly, the present invention is adapted to be embodied in an infant feeding apparatus. The infant feeding apparatus includes a container, a nipple device mounted at an end of the container, and a taste-modifying agent impregnated, absorbed, adsorbed, or otherwise held by the nipple device. The container is adapted to hold a quantity of drinking water. The nipple device is adapted to dispense drinking water from the container. The nipple device is provided with a sufficient amount of impregnated, absorbed, adsorbed or held taste modifying agent in a manner effective to enhance the flavor of drinking water dispensed thereby.

Additional features and advantages of the present invention will become clear from the following description.

BRIEF DESCRIPTION OF THE DRAWINGS

The structure and manner of operation of the invention, together with the further objects and advantages thereof, may best be understood with reference to the following description taken in conjunction with the accompanying drawings wherein identical reference numerals identify similar elements, and wherein.

DETAILED DESCRIPTION OF THE PREFERRED EMBODIMENT

The following discussion of the preferred embodiments of the present invention is exemplary in nature.

Generally, the present invention provides flavored structures for beverage dispensing. More specifically, the present invention provides an odored and /or flavored mouthpiece device for use with a drinking container. In particular, the present invention provides a nipple or straw having an odor or flavoring agent impregnated or absorbed within the material thereof, for enhancing the taste of a beverage. Some embodiments of the invention involve a flavoring or odoring agent adsorbed or coated on the exposed surface of the nipple or straw, that is, the surface which is to come into contact with the child's mouth.

According to preferred embodiments of the invention, a fruit-flavored nipple is provided. Flavors considered especially advantageous for use in this invention include any which are likely to be enjoyed by young children. Fruit flavors such as apple, grape, pear, cherry, strawberry, orange, lemon, lime, blends, and others are all generally enjoyed by young children and may be employed according to the invention. According to a more preferred embodiment, concentrated fruit juice drink saturates the nipple such that the fruit flavors are absorbed into the nipple material and impregnate the nipple. According to some embodiments of the invention, silicone or LATEX nipple materials are saturated in a concentrated fruit juice for an extended period of time, for example, overnight, and absorb the fruit juice flavoring.

Suitable drinking containers, contemplated for use in the present invention, include drinking bottles functional for feeding liquids to young children, for example, children less than 3 years old. Preferably, such drinking bottles are reusable and capable of holding a child's drinking water for consumption.

Figure 1:
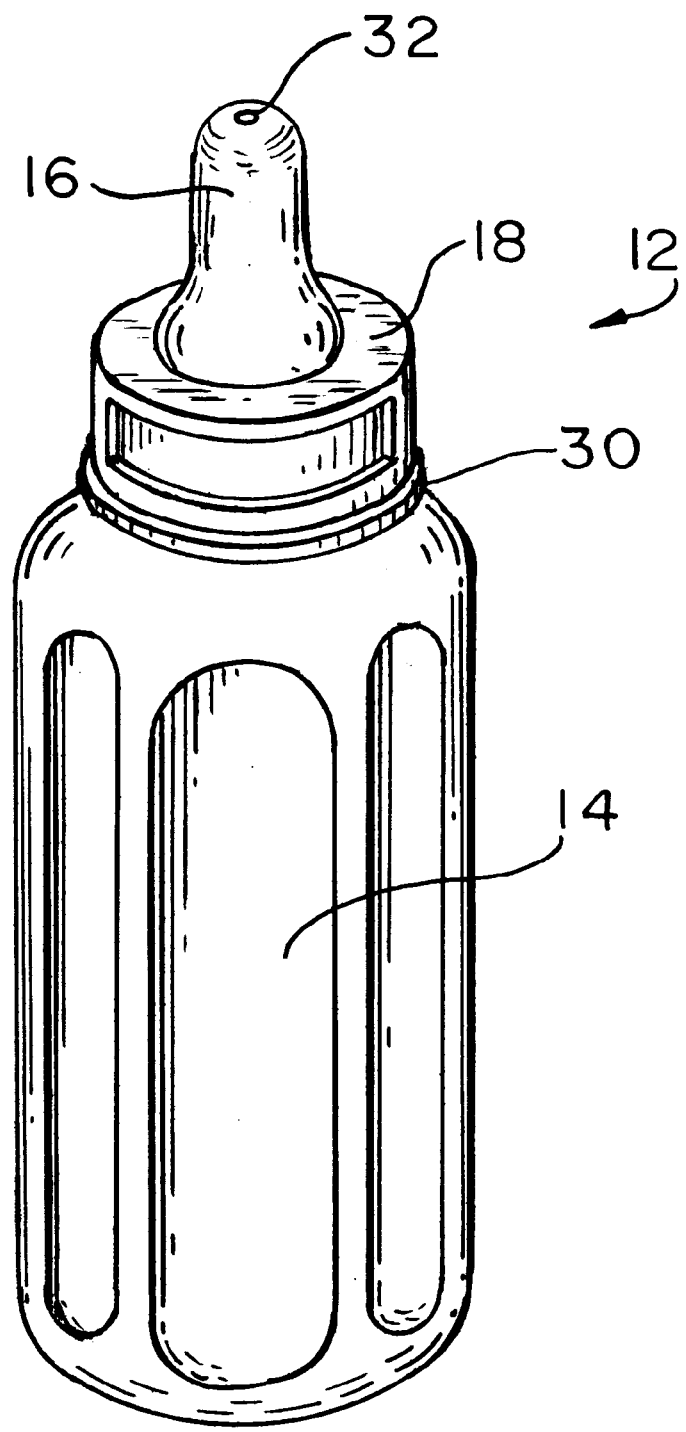
FIG. 1 is a side view of a beverage dispensing arrangement having a flavored nipple prepared in accordance with the teachings of the present invention.

FIG. 1 is a side view of a beverage dispensing arrangement constructed in accordance with the teachings of the present invention. Particularly, the beverage dispensing arrangement shown in FIG. 1 is a baby's drinking bottle. The drinking bottle of FIG. 1 is designated generally by the reference numeral 12.

Figure 2:
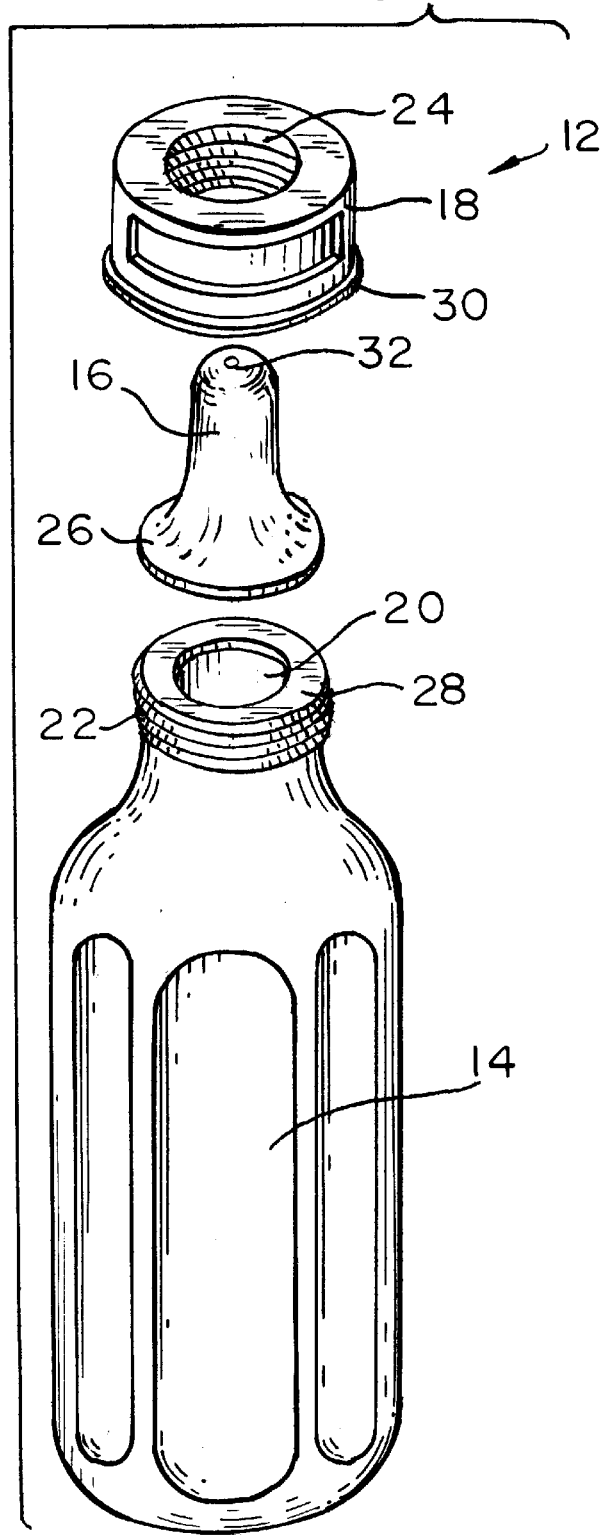
FIG. 2 is an exploded view of the beverage dispensing arrangement of FIG. 1.

FIG. 2 is an exploded view of the beverage dispensing arrangement of FIG. 1. With additional reference to FIG. 2, drinking bottle 12 includes several basic component parts. The basic component parts include a container 14, a nipple device 16, and an annular retaining cap structure 18. The nipple 16 is mounted in place over an upper opening 20 of container 14 by the cap 18.

Generally, the container 14 and cap 18 can be constructed for use with many devices in the art. For example, an upper outer surface of the container 14, near the opening 20, can be provided with threads 22 thereabout. The inner side surfaces within the cap 18 can also be provided with threads 24. The threads 22 of the container 14 are adapted to engage and mate with the threads 24 provided within the cap 18 in such a fashion as to permit a person to manually screw the cap 18 in place atop the container 14 and form a substantially leakproof seal.

As shown in FIG. 2, the nipple 16 is disposed between the container 14 and the cap 18. The nipple 16 is provided with an outwardly extending flange 26 around its lower end. A lower surface of the flange 26 is adapted to engage an annular upper lip area 28 of the container 14. An upper surface of the flange 26 is adapted to engage an annular lower lip portion 30 of the cap 18. Such construction allows the flange 26 to become pinched between the cap lower lip 30 and the container upper lip 28 when the cap 18 is screwed in place upon the container 14. In this way, the nipple 16 may be securely mounted in place against the container 14. The assembled component parts, just described, are depicted in FIG. 1. The flange 26 not only secures the nipple 16 between the container and the cap, but also acts as a sealing gasket therebetween.

The nipple 16 is provided with a feeding tip 32 extending through its uppermost portion. The feeding tip 32 is constructed in a manner permitting a child to draw a liquid therethrough upon application of a sucking force.

The container 14 and the cap 18 may be constructed of any suitable materials generally known and employed in the art. Preferably, non-toxic, impact and corrosion resistant, plastic/polymeric materials form these components.

The beverage dispensing arrangement 12 can be employed to feed fluids to children, particularly young children including infants and toddlers. As indicated above, the nipple 16 is flavored or odored to encourage children to willingly drink certain fluids which they might otherwise refuse due to a bland, otherwise objectionable, taste. In particular, it is contemplated to dispense water from the arrangement 12.

The nipple 16 preferably utilizes a flavoring means (e.g., a chemical compound, composition, solution or mixture) capable to remain effective throughout repeated uses extending over a substantial period of time. While many suitable odoring or flavoring agents known in the art may be utilized to prepare a flavored nipple according to the invention, it is preferable to flavor the nipple with natural flavors or odors instead of artificial ones.

A preferred method of making the taste-modifying nipple of the invention will now be described. Initially, a liquid flavoring agent is poured into a container. Any suitable commercially available flavoring agent may be used in connection with the invention. Preferred flavoring agents include fruit juice concentrates, particularly fruit juice concentrates, used at full concentrate strength. According to a preferred embodiment of the invention a fruit juice concentrate, recommended for a 3 to 1 dilution in water, is used at full concentrate strength, without dilution. One flavoring agent is a black cherry fruit juice concentrate available under the trade name KNUDSON.

According to some embodiments of the invention, the flavoring agent is a highly concentrated saturated solution or mixture of a powdered drink mix partially dissolved in a relatively small amount of water. For example, a saturated solution of a powdered lemonade mix. According to an embodiment of the invention, absorption of the agent into a nipple or straw device is enhanced by soaking in a completely saturated solution of powdered drink mix.

Next, a nipple is placed in the container along with the flavoring agent. Any suitable commercially available rubber, silicone, latex or polymeric nipple may be used in connection with present invention. Silicone and latex nipples tend to readily absorb and hold liquid fruit juice concentrate; such nipple materials continue to flavor water dispensed thereby for repeated uses. One such nipple contemplated for use with the invention is available from GERBER under the trade name NUK.

Preferably, the nipple is substantially immersed within the liquid flavoring agent, and more preferably, fully immersed. While overnight soaking times, e.g., eight hours, result in a flavored nipple, soaking times of several days are preferred. According to a more preferred embodiment, the nipple or straw soaks in the flavoring agent for at least about one week. According to even a more preferred embodiment, the nipple or straw soaks in the flavoring agent for at least about two weeks.

Silicone and latex nipples are soaked for from about two weeks to about three weeks according to an embodiment of the invention. In accordance with this method, the nipple is impregnated with the flavoring agent so that the taste of a beverage dispensed via the nipple will be effectively modified.

It has been found that when silicone or latex nipples are soaked in a concentrated liquid fruit juice concentrate for a two week duration, the nipple can be rinsed and cleaned with approximately 120° F. water multiple times before substantial fading of the absorbed flavoring agent is noticed. Thus, flavored nipples made in accordance with the invention can be reused many times before another flavoring treatment is needed. Preferably, a clean nipple or straw is soaked in a flavoring agent until just prior to use.

To prevent mold formation and spoilage of the juice concentrate, the immersed straw or nipple should be soaked under refrigerated conditions. Freezer conditions could be used but would preferably be at a freezer temperature which does not completely freeze the concentrate. Soaking in a sealed container is preferred.

Many nipples and/or straws may be soaked simultaneously in a single container.

Plastic drinking straws can also be employed according to the invention. According to an embodiment of the invention, plastic drinking straws are placed in a sealed container soaking in a fruit juice concentrate.

According to another embodiment of the invention, a flavoring or odoring agent is mixed with or permeated with a thermoplastic material, and the material is subsequently molded into the shape of a nipple or straw. A preferred treatment involves incorporating an odorous medium for emitting a selected scent, and a colorization selected to impart a visual perception corresponding to the selected scent. Exemplary combinations of colorization and corresponding scent include red/strawberry, brown/chocolate, and egg shell/vanilla. The odorous medium with or without the colorization agent is combined with the thermoplastic material prior to molding the thermoplastic material. A suitable red/strawberry ingredient, for example, is available as KC-21055 from Accurate Color Inc. Experimentation has shown that a mixture of 4 pounds of the selected ingredient to 100 pounds of the base thermoplastic material will yield satisfactory results. Permeation of such odorous agents into thermoplastic materials is described further in U.S. Pat. No. 5,109,839, which is incorporated herein in its entirety.

In use, the container 14 is filled with a liquid beverage. As indicated above, it is contemplated herein that the container should hold drinking water for dispensing to a young child. The arrangement 12 is then assembled, as described above, and provided to a child. By sucking on the nipple 16, the child can drink the beverage from the arrangement 12, as desired, and the taste of plain drinking water is modified by the nipple device to taste of the flavoring or odoring agent.

The appealing taste sensation provided by the taste-modifying nipple and straw of the invention promotes the consumption of liquids which children otherwise often refuse due to a bland, or otherwise objectionable, taste. For example, the present invention can give ordinary drinking water the sensation of a new and enjoyable taste.

The useful advantages offered by the naturally odored and flavored nipples and straws of the present invention can benefit physicians including pediatricians, hospitals, dentists, parents, and anyone else responsible for the care of a young child.

Those skilled in the art can now appreciate from the foregoing description that the broad teachings of the present invention can be implemented in a variety of forms. Therefore, while this invention has been described in connection with particular embodiments and examples thereof, the true scope of the invention should not be so limited. Various changes and modifications may be make without departing from the scope of the invention, as defined by the appended claims.

What is claimed is:

1. An infant feeding apparatus, comprising: a container, a nipple device mounted on said container, and a taste-modifying agent incorporated in a surface of said nipple device which is to come into contact with a user's mouth; wherein said container is adapted to hold a quantity of drinking water and said nipple device is adapted to dispense said drinking water from said container; and wherein said nipple device is provided with an amount of said taste-modifying agent in a manner effective to enhance the flavor of said drinking water dispensed thereby.

2. An infant feeding apparatus as recited in claim 1, wherein said taste-modifying agent is further effective to enhance the odor of said drinking water dispensed via said nipple device.

3. An infant feeding apparatus as recited in claim 1 wherein said container is an infant nursing bottle.

4. An infant feeding apparatus as recited in claim 3, wherein said nipple device is impregnated with said taste-modifying agent.

5. An infant feeding apparatus as recited in claim 4, wherein said taste-modifying agent is a natural fruit flavoring.

6. An infant feeding apparatus as recited in claim 3, wherein said taste-modifying agent is absorbed into said nipple.

7. An infant feeding apparatus as recited in claim 1, wherein said nipple device is formed from a flexible polymeric material.

8. An infant feeding apparatus as recited in claim 7, wherein said nipple comprises a material selected from the group consisting of silicone materials and latex materials.

9. An infant feeding apparatus as recited in claim 1, wherein said nipple device comprises a molded thermoplastic material and said taste-modifying agent has been mixed with said thermoplastic material prior to said thermoplastic material having been molded.

10. A method of flavoring a baby bottle nipple comprising:

providing a baby bottle nipple comprising a material;

contacting said nipple with an agent selected from the group consisting of flavoring agents and odoring agents, for at least one-week such that said agent is retained by the material of said nipple; and after said nipple contacts said agent for at least one-week, drawing a liquid having a taste through said nipple such that the taste of said liquid is modified by said nipple to have a taste of said agent.

11. A method as in claim 10, wherein said agent is a fruit drink and contacting includes soaking said nipple in said fruit drink for at least about one week.

12. A method as in claim 11, wherein said fruit drink is a concentrated fruit drink.

13. A method as in claim 10, wherein said nipple comprises at least one material selected from the group consisting of silicone materials and latex materials.

14. A method as in claim 10, wherein said contacting occurs for at least about two weeks.

15. An infant feeding apparatus, comprising: an infant nursing bottle; a nipple device mounted on said bottle; and a taste modifying agent incorporated in said nipple device, wherein said bottle is adapted to hold a quantity of drinking water and said nipple device is adapted to dispense said drinking water from said bottle; and wherein said nipple device is provided with an amount of said taste-modifying agent in a manner effective to enhance the flavor of said drinking water dispensed thereby.

16. An infant feeding apparatus as recited in claim 15, wherein said nipple device is impregnated with said taste-modifying agent.

17. An infant feeding apparatus as recited in claim 16, wherein said taste-modifying agent is a natural fruit flavoring.

18. An infant feeding apparatus as recited in claim 15, wherein said taste-modifying agent is absorbed into said nipple.

19. An infant feeding apparatus as recited in claim 15, wherein said nipple device is formed from a flexible polymeric material.

* * * * *